United States Patent [19]

Bureller

[11] Patent Number: 5,613,810
[45] Date of Patent: Mar. 25, 1997

[54] PNEUMATIC POWER DRILL

[75] Inventor: Michel Bureller, Antony, France

[73] Assignee: Etablissements Recoules et Fils (S.A.), France

[21] Appl. No.: 455,657

[22] Filed: May 31, 1995

[30] Foreign Application Priority Data

May 31, 1994 [FR] France .................................. 94 06584

[51] Int. Cl.⁶ .......................... B23B 39/08; B23B 39/10
[52] U.S. Cl. .................... 408/3; 408/11; 408/129; 408/702
[58] Field of Search ............................. 408/3, 8–15, 17, 408/129, 137, 72 B, 702

[56] References Cited

U.S. PATENT DOCUMENTS

| 4,076,442 | 2/1978 | Cox, Jr. et al. ............................. 408/8 |
| 4,688,970 | 8/1987 | Eckman ..................................... 408/9 |
| 4,985,841 | 1/1991 | Iwagaya ..................................... 408/1 |
| 5,116,168 | 5/1992 | Aihara ....................................... 408/9 |
| 5,349,337 | 9/1994 | McCormick ............................. 408/17 |
| 5,372,464 | 12/1994 | Bureller ................................. 408/72 B |

Primary Examiner—Steven C. Bishop
Attorney, Agent, or Firm—Eckert Seamans Cherin & Mellott

[57] ABSTRACT

A portable pneumatic power drill whose tool-carrying spindle is rotated by a pneumatic motor. According to the invention spindle speed is under the control of an electric motor as a function of the speed of rotation of the tool-carrier spindle and of instructions stored in a memory card, control being provided by two microprocessors. This provides operating modularity that is better than that of conventional power drills.

10 Claims, 3 Drawing Sheets

PNEUMATIC POWER DRILL

The present invention relates to a pneumatically-driven portable power drill of the type in which a pneumatic motor rotates a spindle that is capable of receiving various tools, the drill being intended particularly, but not exclusively, for use in the aviation industry.

BACKGROUND OF THE INVENTION

Such drills are well known and are used in preference to drills having electrical drives both because of their power/weight ratio and also for safety reasons. In known drills, a single pneumatic motor serves both to apply rotary drive to a spindle and also, via a lead screw and nut, to feed the same spindle in translation.

The drawback of such drills results from the fact that, in practice, they are capable of rotating, and consequently of feeding, at one speed only, as determined by the speed of rotation of the pneumatic motor. The speed of rotation of the spindle and its feed rate can naturally be altered by exchanging an existing set of gears for another set that provides a different speed ratio. Thus, a single drill needs to have several motors and several sets of gears in order to change between types of application, e.g. to go from a feed rate of 0.1 millimeters per revolution (mm/rev) to 0.3 mm/rev, which involves assembly and disassembly, or else having numerous drills.

Unfortunately, and particularly in aviation, it is becoming more and more common to use composite materials made up of layers of different materials, and in particular aluminum-carbon-titanium laminates. Each of these materials requires different working conditions. This gives rise to problems of surface state, accuracy, and/or cycle time.

OBJECTS AND SUMMARY OF THE INVENTION

An object of the present invention is to mitigate that drawback and to enable programmable tooling to be provided which is capable of working under optimum conditions regardless of the materials to be machined and their disposition within a laminated material, and in particular to provide a variable feed rate function for the spindle, i.e. for the tool relative to the workpiece.

According to the invention, in mechanical tooling including a pneumatic motor that rotates a tool-carrier spindle, spindle feed is controlled by a low voltage electric motor, itself controlled by an electronics card as a function of stored instructions and of the speed of rotation of the tool-carrier spindle.

In a cutting device, such as a drill, it is known that 9/10ths of the energy consumed goes in cutting proper, while the remaining tenth is used to drive tool feed. Using a second motor that is electrical is therefore justifiable given that it is of small power, and consequently light in weight. An electric motor can easily be controlled by an electronics card including a microprocessor which takes charge of performing a machining program. It can cause spindle feed to take place in fractions of a step by chopping the electrical power supply.

According to another characteristic of the invention, the electronics card includes two microprocessors operating in parallel, one of them being synchronous and controlling the electric motor, while the other is asynchronous and controls the way the machining program runs as a function of various available parameters. Thus, when the nominal speed of the spindle drops, e.g. by 20%, or when it reaches a stored threshold, the microprocessor reduces the feed rate of the spindle, thereby relieving driving torque, and thus optimizing the operation of the tool.

BRIEF DESCRIPTION OF THE DRAWINGS

Other characteristics and advantages of the invention appear from the following description of a particular embodiment, given solely by way of nonlimiting example, and with reference to the accompanying drawings, in which.

MORE DETAILED DESCRIPTION

Figure 1:
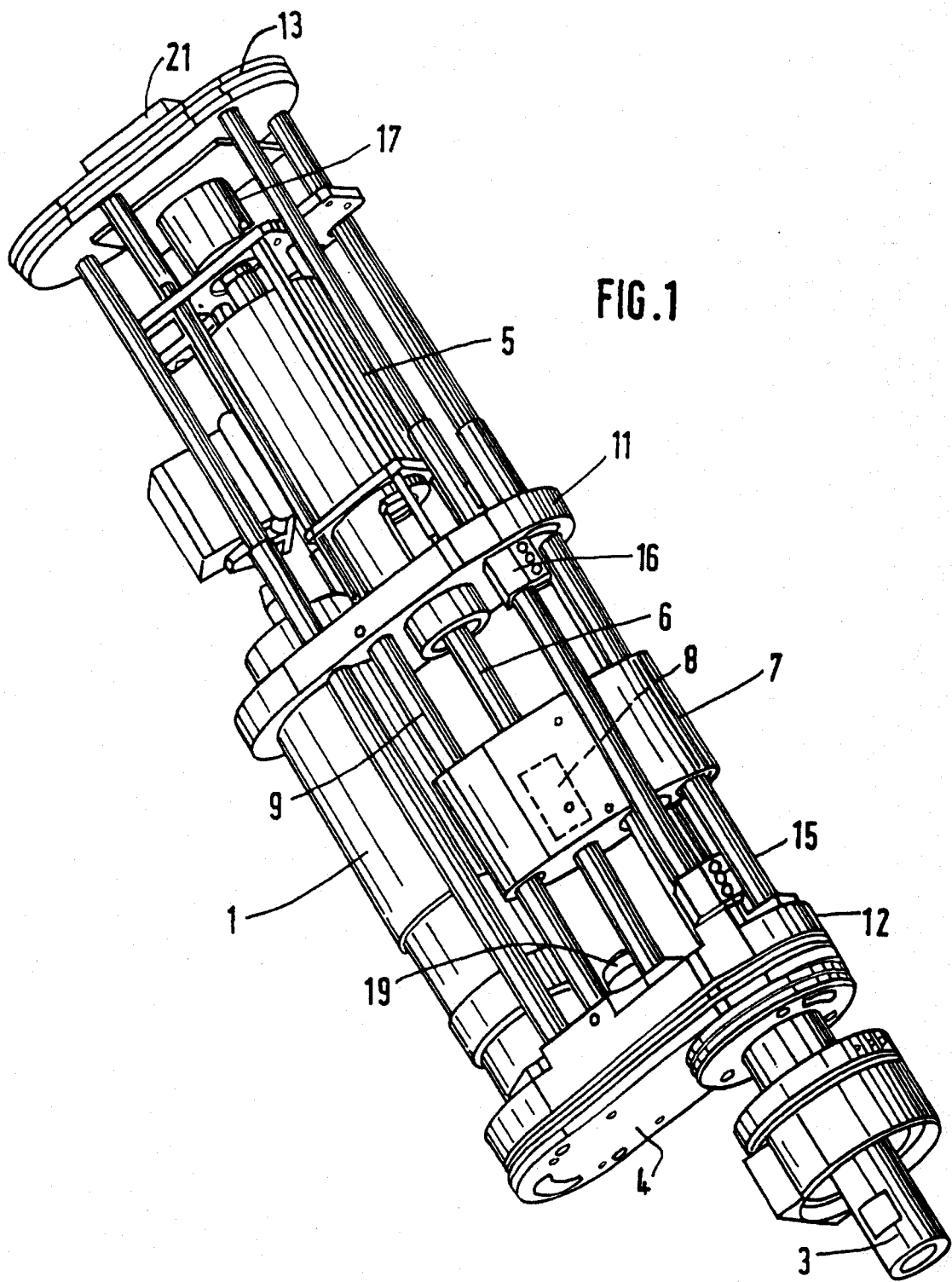
FIG. 1 is an elevation view of a drill of the invention.
Figure 2:
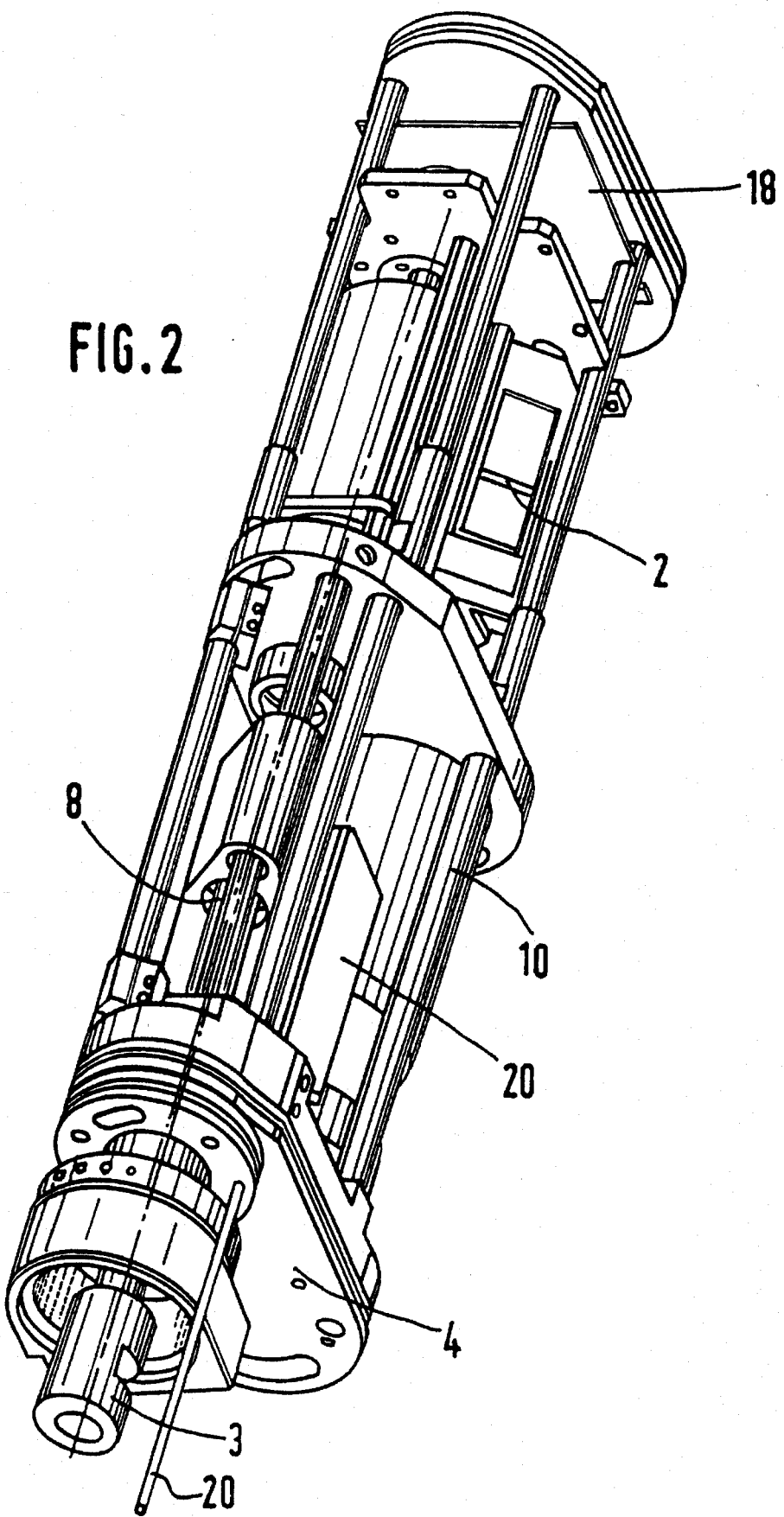
FIG. 2 is a perspective view from above.

In the figures, it can be seen that a framework made up of three plates 11, 12, and 13 that are interconnected by spacers 10 contains a pneumatic motor 1 and an electric motor 5 that is a stepper motor. The pneumatic motor is controlled by a solenoid valve 2. It rotates a tool-carrier spindle 3 via a set of gears 4, which spindle is designed to receive a drill bit, a countersink, a reamer, or any multi-purpose tool comprising several stages. The connection between the outlet shaft of the pneumatic motor 1 and the spindle 3 takes place via the set of gears 4 which are included in a housing. In the example shown, the spindle is a single speed spindle, however it is preferable to incorporate between the pneumatic motor 1 and the gear train 4 either a conventional two-position clutchable gearbox system that is electrically controlled by the program, or else to a linear speed varying system (using a ball or any other system) likewise under electronic control. This makes it possible to obtain a much wider range of speeds, as is often required with modern materials.

The framework also carries a two-processor electronics card 18 which controls and monitors proper functioning of tool speed relative to a pre-stored program, and in particular:

the operation of peripherals such as safety features, cycle starting, display, lubrication, speed selection; and the behavior of the electric motor as a function of parameters such as spindle speed, depth, and safety.

These parameters are supplied to the card, in particular by a tachometer pickup 19 for servo-controlling the feed motor to the speed of the pneumatic motor, and by an optoelectronic pickup 17 for monitoring the feed displacement provided by the motor 5, and the accuracy thereof.

These elements provide the basis on which the drill operates for two spindle speeds and for controllable feed rate.

The motor 5 rotates a feed spindle 6 having a pitch of 1 millimeter, for example. The stepper motor may be replaced by a DC motor or by any other motor. The spindle 6 drives a carriage 7 via a nut 8 having recirculating rollers, the nut 8 being guided by two spacer shafts 9 which keeps the entire system rigid in co-operation with the other spacers 10 that are fixed to the plates 11, 12, and 13 of the framework. It is possible to save space by putting the motor 5 parallel with the spindle 6, so that the motor drives the spindle via pulley wheels and cog belts. This makes it possible to have a mechanical compartment that contains the carriage, the spindle, etc., and a separate electronics compartment.

The carriage 7 is fixed to the spindle 3 and drives it in translation as soon as the motor 5 begins to revolve. This feed displacement is monitored by two position pickups 15 and 16, the pickup 16 providing a reference zero position from which cycling and measurement starts.

An incremental rotary pickup 17 is fixed at the end of the shaft of the motor 5 and transmits information to the processing electronics card 18. A tachometer 19 placed on a drive gear wheel of the pneumatic motor provides the same electronics card with a measurement of the speed of rotation of the spindle. The tachometer may be replaced by a Hall-effect bearing, or by any other speed detector.

In application of the program installed in its two microprocessors, the electronics card 18 observes the displacement performed by the spindle, and compares it with the programmed amounts of feed; it also monitors the speed of rotation of the spindle by means of the tachometer and the safety features, and it modulates feed:

if the reference depth has been reached;

if the microprocessor observes that the speed of the spindle is less than the speed it ought to have.

The electronics card 18 is based on the principle of parallel machines. The two on-board microprocessors implement reduced instruction set computer (RISC) technology and they are respectively synchronous and asynchronous. The synchronous microprocessor controls the motor 5 while the asynchronous microprocessor monitors the man-machine environment, i.e. it takes charge of parameters other than those concerned with controlling rotation of the synchronous motor, i.e. executing the program, monitoring the pickups, monitoring safety features, starting, stopping, etc.

The motor 5 is controlled using a variable step-size algorithm, being driven in half-steps at low speed, in single steps at intermediate speed, and in multiple steps for rapid advance and return (these parameters can be adapted according to circumstances). The microprocessor can chop the electrical power supply to obtain operation in fractions of a step.

A programmable card 21 that is separate from the control and power card but that is connected thereto is removably mounted at the back of the drill. It is fixed in sealed manner by a housing that is itself sealed and that is suitable for rapid dismounting. It is this card that stores the parameters representing a complete fabrication cycle (speeds, feeds, depths, swarf removal, lubrication, and other variables). This card is programmed by means of a microcomputer via an RS 232 serial link. While the drill is being set up, prior to being put into operation on a manufacturing line, the setter transfers data and modifies it at will. The results are inspected on a test bench and finally they are stored. The drill takes the data into account and modulates its displacements accordingly when performing productive work.

The exhaust air from the pneumatic motor 1 is preferably reinjected into the body of the drill via a filter so as to keep the inside of the drill housing pressurized while it is in operation, thereby preventing infiltration, and also blowing air over the electronic power components that are mounted on heat-sink radiators.

Axial lubrication is performed in the spindle 3 by a dip tube that slides inside the spindle, with sealing being provided by 0-rings. The lubrication is likewise under program control using solenoid valves that can be operated at various frequencies and durations relative to depth.

Locking of the drill on a drilling jig is monitored by means of a position pickup (not shown) mounted on the jig locking mechanism which is of the kind described in U.S. Pat. No. 5,372,464. In that device, locking requires the drill to be held in both hands while it is being locked to the jig.

An axial position feeler 20 is installed within the body of the drill. The feeler socket transmits accurate information concerning the position of the tool relative to the workpiece and to the axial feeler. This information is transmitted to the microprocessor card 18 which compares its value with a previously stored setting. The drill adjusts its own displacement accordingly.

The tooling which is removable from the drill includes holes on a sector thereof which are "read" by pickups placed in the body of the drill. Depending on the various possible combinations of holes, a tooling code can be interpreted by the drill to authorize operation thereof.

These various parameters provide operating modularity that is much better than that of conventional drills and it depends merely on loading and unloading a program card which can be done in a few seconds, and on pneumatic drive with, for example, two electronically selectable fixed speeds. The feed rate of the tool is linear and varies over the range 0.035 mm/rev to 0.3 mm/rev. Together, these parameters give an exact indication of depth which is monitored continuously. It is thus possible to penetrate into a given material at a greater or lesser rate, to perform swarf-removal cycles, and to perform one-off operations of extracting the spindle while it is not rotating.

Figure 3:
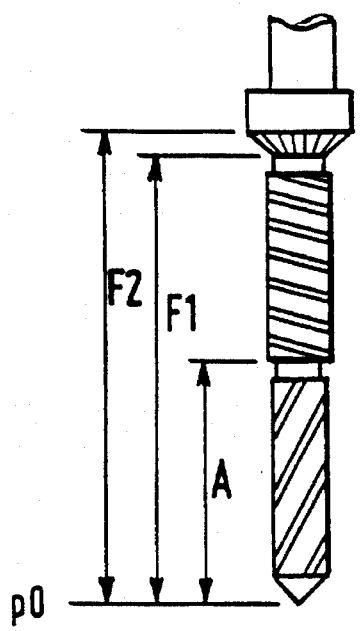
FIG. 3 is a diagram explaining multi-layer machining.

FIG. 3 shows an example of how tooling of the invention can be used. The top of the figure shows a multi-purpose tool 22 having at its bottom end a drill bit of height A, followed by a reamer of height F1, and a countersink of height F2. This tool serves to perform drilling, reaming, and countersinking at the top of the hole.

The material to be drilled is a laminate comprising, from top to bottom, a layer of aluminum, a layer of carbon fibers, and a layer of titanium, each of which materials needs to be worked at a different speed of rotation and feed rate for the tool. In the example shown, the feed rates for drilling each of the three layers are respectively 0.3 mm/rev for the aluminum, 0.5 mm/rev for the carbon, and 0.06 mm/rev for the titanium.

Figure 4:
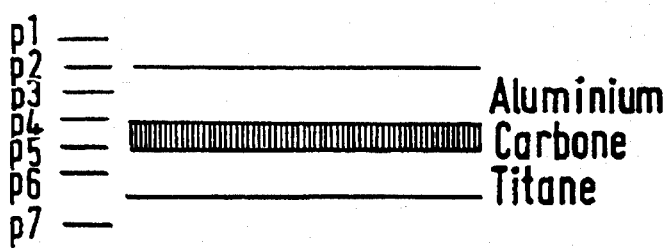
FIG. 4 shows the positions of the tool while performing the machining of FIG. 3.
Figure 4:
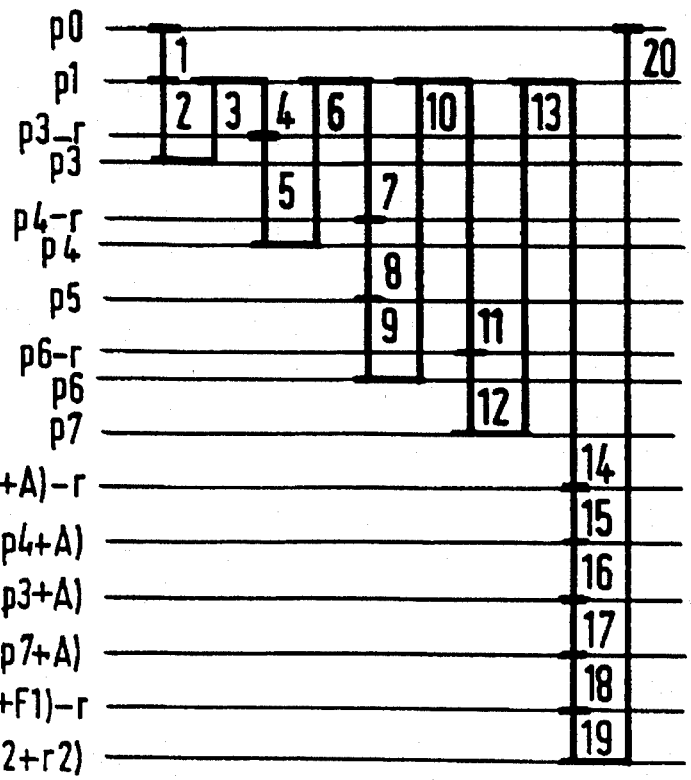

FIG. 4 shows the position of the tip of the tool. The numbers in the figure are program block numbers.

Initially, the tool is above the workpiece in a position p0, and its speed of rotation and feed rate are zero. Then, the tool is fed quickly to take up position p1 which is still outside the workpiece, but close thereto. The first operation consists in drilling the aluminum, with the tool moving down to position p3 (feed rate 1). Rapid return to p1 allows swarf to be removed from the tool. Then the tool advances rapidly to p3 (minus a setback r) and starts to drill the aluminum again (feed rate 1). Then it returns to p1 for swarf removal. Thereafter it advances rapidly to p4 minus the setback.

The aluminum has now been drilled. The next step consists in drilling the carbon (feed rate 2 greater than rate 1). The tool advances to p5 drilling through the carbon, and then advances to p6 where it drills the titanium (feed rate 3). At this time it returns rapidly to p1 for swarf removal and then starts advancing again from p6 minus the setback, i.e. a position in which it continues drilling the titanium (feed rate 3). After which it performs another rapid return to p1 for swarf removal purposes.

A rapid advance to p2+A-setback during the subsequent advance serves to ream the aluminum (feed rate 4), then from p4+A to ream the carbon (feed rate 5), and then from p5+A to ream the titanium (feed rate 6). Thereafter the aluminum is countersunk by advancing the tool to p2+F2 (feed rate 7).

The tool then returns to position p0 and the microprocessor stops spindle rotation. The spindle is also returned immediately to this position if ever its speed of rotation departs from its acceptable range.

As can be seen from the above example, it is necessary to use seven different feed rates for the tool, corresponding to the different kinds of machining and the different materials involved. Only electronic control is capable of providing this degree of variation.

Naturally, numerous variations can be applied to the invention, in particular by substituting equivalent technical means, without thereby going beyond the ambit of the invention.

I claim:

1. A pneumatically-powered drill comprising a pneumatic motor disposed to apply rotary drive to a tool-carrier spindle, wherein spindle feed is controlled by an electric motor as a function of the speed of rotation of the tool-carrier spindle and of instructions stored in a memory electronics card and made use of in a control and power supply electronics card.

2. A pneumatic power drill according to claim 1, wherein the control and power supply card includes two microprocessors operating in parallel, one of them being a synchronous microprocessor controlling the electric motor, and the other being an asynchronous microprocessor handling the other parameters of the drill.

3. A pneumatic power drill according to claim 1, wherein the memory card is removably connected to the control and power supply card, and stores the instructions required for performing a particular machining program.

4. A pneumatic power drill according to claim 1, wherein a tachometer pickup is disposed on a set of gears connecting the shaft of the pneumatic motor to the spindle, an incremental rotary pickup monitoring axial displacement of said spindle.

5. A pneumatic power drill according to claim 1, wherein a depth feeler projects ahead of the drill and measures the position of the tool relative to the workpiece.

6. A pneumatic power drill according to claim 1, wherein the outlet shaft of the electric motor drives a feed spindle which in turns drives a roller recirculation nut, with translation displacement of the nut being detected by position pickups for zero-point and end-of-stroke settings.

7. A pneumatic power drill the according to claim 1, wherein lubrication is controlled by the control and power supply card.

8. A pneumatic power drill according to claim 1, wherein exhaust air from the pneumatic motor is recycled, after filtering, through the housing of the drill.

9. A pneumatic power drill according to claim 1, wherein an electrically controlled clutch device enables two different speeds of rotation to be selected.

10. A pneumatic power drill according to claim 1, wherein drill is positionable under electronic control.

* * * * *